E. F. COLLINS.
ELECTRIC WELDING.
APPLICATION FILED FEB. 19, 1913.
1,144,350.
Patented June 29, 1915.
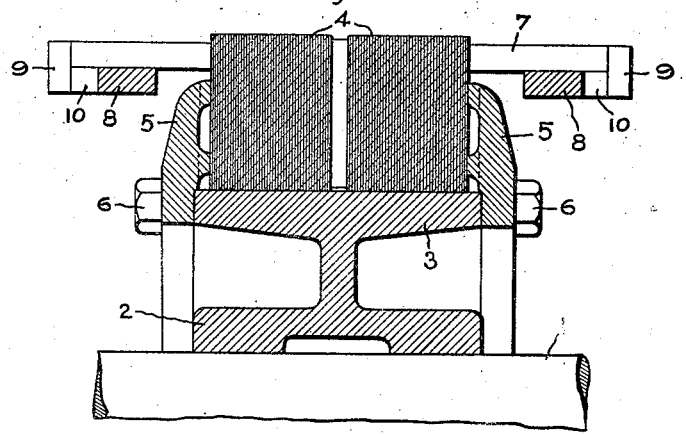
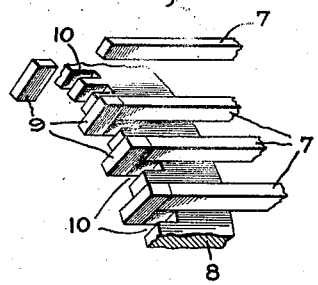
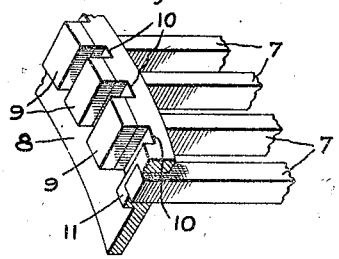
Witnesses:
Inventor
Edgar F. Collins,
by
His Attorney.

UNITED STATES PATENT OFFICE.

EDGAR F. COLLINS, OF SCHENECTADY, NEW YORK, ASSIGNOR TO GENERAL ELECTRIC COMPANY, A CORPORATION OF NEW YORK.

ELECTRIC WELDING.

1,144,350.   Specification of Letters Patent.   Patented June 29, 1915.

Application filed February 19, 1913. Serial No. 749,360.

*To all whom it may concern:*

Be it known that I, EDGAR F. COLLINS, a citizen of the United States, residing at Schenectady, county of Schenectady, State of New York, have invented certain new and useful Improvements in Electric Welding, of which the following is a specification.

My invention has reference to a method of welding and is particularly applicable to the securing of the end ring of an induction motor of the squirrel cage type to the conductor bars, although it will be obvious that in its broader aspects my invention is not thus limited.

For a fuller understanding of my invention reference may be had to the accompanying drawings, in which I have illustrated the application of my invention to the construction of an induction motor.

Figure 1 is a vertical section of a part of the rotor of an induction motor in which I have shown my invention embodied: Fig. 2 is a detail view showing the method of assembling the parts in accordance with my invention, and Fig. 3 is a modification.

In the drawings, 1 is a shaft on which the armature of an induction motor is mounted. A spider 2 is secured on the shaft 1 and provided with a peripheral flange 3, on which is mounted the usual laminations 4. These laminations are secured in position by means of end clamping plates 5 and bolts 6. The conductor bars 7 are mounted in slots in the laminations 4 in the usual manner and are engaged at their ends by the usual short circuiting ring 8.

My invention embodies a method of welding the conductor bars to the end rings and consists in welding a metallic clip 9 to both the conductor bar and the end ring.

The radiating and conducting capacity of an end ring such as is ordinarily used in an induction motor is relative to the bar so great as to render difficult the welding of the ring directly to the conductor bar. My invention, therefore, provides a method by which the ring is indirectly secured to the conductor bar, which consists in welding a third member both to the end ring and to the end of the conductor bar.

In order to largely confine the radiation and conduction of heat from the end ring to the region of the contact surface between the end ring and the conductor bars and thus localize the heat, I provide radial slots 10 in the end ring, which extend inwardly from the outer surface of the end ring. This effectively segregates the metal of the end ring which is to be welded to the metallic clip, and prevents a prohibitive radiation and conduction of heat, at the same time maintaining the contacting surface of the end ring at substantially the same temperature as that existing at the contact surface of the conductor bar.

In order to carry out my process, the conductor bar is placed in position on the end ring between two adjacent slots so that the end of the conductor bar rests immediately over the projection formed on the end ring between the two slots. The metallic clip is then placed in position against both the end of the conductor bar and the projection on the end ring, the conductor bar and the end ring constituting one electrode and the metallic clip the other electrode, and, by passing a suitable amount of current between the two electrodes and applying suitable pressure between the metallic clip and the conductor ring and end bars respectively in a manner well understood in the art, the metallic clip is effectually welded to the end ring and the conductor bar and effectively secures the latter two together, and the end ring is thus made substantially integral with the conducting bars.

In Fig. 3, I have shown a modification of my invention in which the conductor bars 7 extend through openings in the end ring 8, the openings being formed in portions 11 of the ring with slots 10 on either side. The metallic clip 9 is applied in the same manner as is the clip in Fig. 2.

The motor construction disclosed herein is the subject of a separate application, Serial No. 814,628, filed Jan. 27, 1914.

In accordance with the provisions of the patent statutes, I have described the principle of operation of my invention, and what I now consider to represent the best embodiment thereof; but I desire to have it understood that I contemplate modifications thereof which I intend to include in the following claims.

What I claim as new and desire to secure by Letters Patent of the United States, is:—

1. The method of securing together by means of a third member two adjacently located metallic members one of which has a greater heat radiating and conducting capacity than the other which consists in welding the third member to the member having the lesser heat capacity and to a segregated portion of the member having the greater heat radiating and conducting capacity, the segregated portion having such a heat radiating and conducting capacity that the temperature of its contacting surface during the welding operation is substantially equal to that of the contacting surface of the lesser capacity member.

2. The method of securing together by means of a third member two adjacently located metallic members one of which has a greater heat radiating and conducting capacity than the other, which consists in welding the third member to the member having the lesser heat capacity and to a segregated portion of the member having the greater heat radiating and conducting capacity, the segregated portion having such a heat radiating and conducting capacity that the temperature of its contacting surface during the welding operation is substantially equal to that of the contacting surface of the lesser capacity member and that of the third member.

In witness whereof, I have hereunto set my hand this 17th day of February, 1913.

EDGAR F. COLLINS.

Witnesses:
   BENJAMIN B. HULL,
   HELEN ORFORD.